Feb. 17, 1970         S. D. DRELL ET AL         3,495,791
METHOD OF AND APPARATUS FOR EFFECTING ELECTRO-MECHANICAL
ENERGY INTERCHANGE IN A SPACE VEHICLE
Filed April 26, 1965
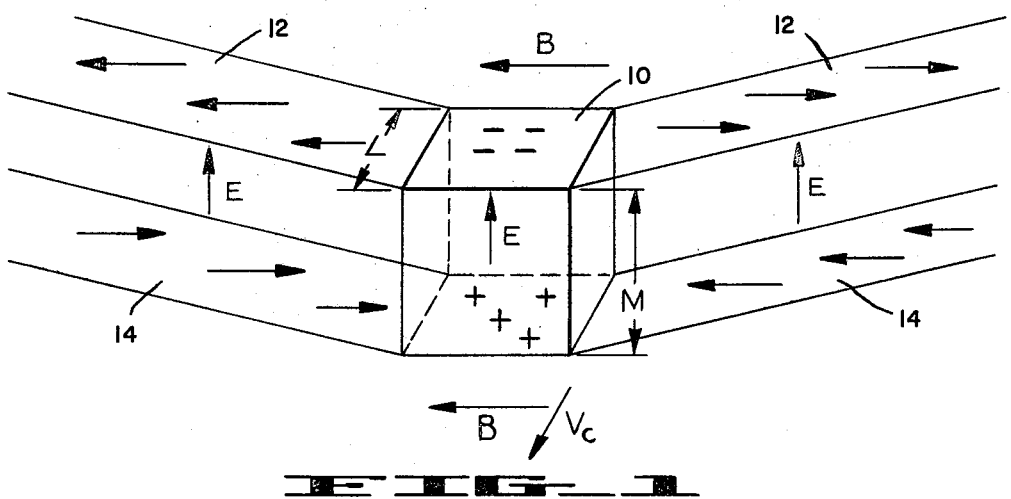
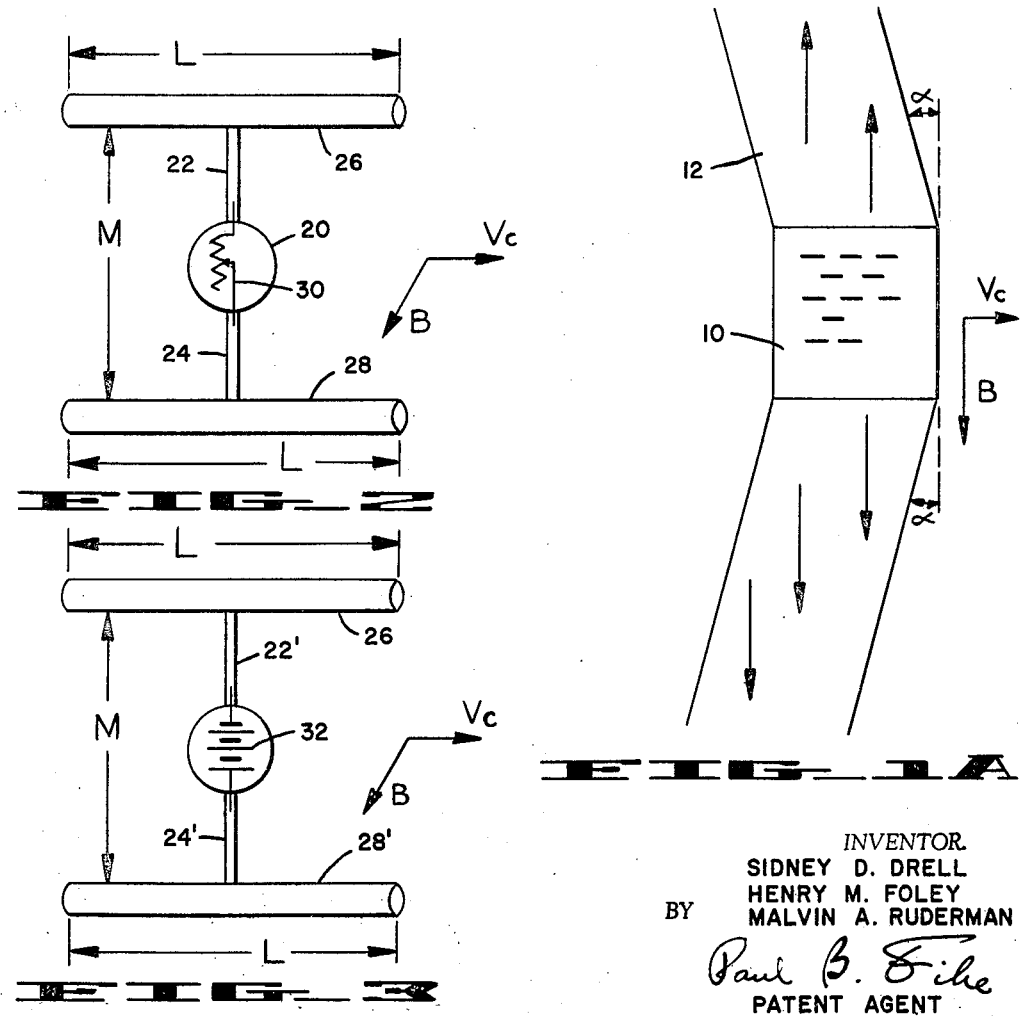
*INVENTOR.*
SIDNEY D. DRELL
HENRY M. FOLEY
BY  MALVIN A. RUDERMAN
PATENT AGENT United States Patent Office 3,495,791
Patented Feb. 17, 1970

3,495,791
METHOD OF AND APPARATUS FOR EFFECTING ELECTRO-MECHANICAL ENERGY INTERCHANGE IN A SPACE VEHICLE
Sidney D. Drell, 570 Alvarado Row, Stanford, Calif. 94305; Henry M. Foley, 460 Riverside Drive, New York 10027; and Malvin A. Ruderman, 29 Washington Square W., New York 10011, both of New York
Filed Apr. 26, 1965, Ser. No. 450,798
Int. Cl. B64g 1/20
U.S. Cl. 244—1
12 Claims

ABSTRACT OF THE DISCLOSURE

A propulsion method and apparatus for space vehicles wherein the movement of a conductive element on the vehicle across the earth's magnetic field produces an electro-mechanical energy interchange through the intermediary of Alfven radiation, so that, in effect, a push or pull against the earth's magnetic field is achieved.

The present invention relates generally to space vehicles and more particularly to a method of and apparatus for effecting electro-mechanical energy interchange in a moving space vehicle to control its flight characteristics and/or to provide for energy storage therewithin.

It is well established that any space vehicle, whether it be a satellite arranged to orbit the earth in or above the ionosphere or a vehicle directed along an interplanetary course, must be provided with sufficient fuel or propellant, not only to achieve the requisite initial acceleration from the position of launching, but also to overcome the drag forces experienced in flight. Additionally, most space vehicles also require a source of electrical power for control or communications purposes. It is obvious that these fuel and power requirements reduce the useful "payload" which may be transported by any space vehicle.

Accordingly, it is a general object of the present invention to provide a method of and apparatus for effecting an electro-mechanical interchange in a moving space vehicle so that, for example, propulsion of the vehicle can be effected to overcome the mentioned drag forces without the attendant necessity for carrying conventional fuel for such purpose.

This general object is achieved through utilization of certain scientific principles together with certain experimentally determined facts concerning the environment of a moving space vehicle.

Scientifically, it is now well established that a conductor moving across a magnetic field B with a velocity $v_c$ in a vacuum will have an electrical charge separation induced therein sufficient to cancel the electrical field E seen by a co-moving observer. Mathematically, this fact is expressed by $$E = \frac{v_c \times B}{c} \quad (1)$$

$c$ being the velocity of light. If the vacuum be replaced by a plasma including substantially equal numbers of electrons and ions which can function as an electrical conductor, in effect, a circuit is established whereby the charge induced on the conductor can flow and establish a current, the energy propagating as an Alfven wave along the direction of the established magnetic field, as will be explained in detail hereinafter. Thus an electro-mechanical interchange takes place.

Experimentally, it has been determined not only that a rather large magnetic field exists in the vicinity of the earth, but it varies from 0.5 gauss at the earth's surface to a value of 0.4 gauss in the ionosphere and a value of 0.2 gauss at an altitude of 1600 kilometers whereat the Echo I satellite was orbiting. In turn, the ionospheric plasma at 1600 kilometers has been measured to indicate the existence at this altitude of $5 \times 10^3$ electrons/cm.$^3$ and a corresponding ion mass density of $3 \times 10^{-20}$ grams/cm.$^3$ for He$^+$ or, approximately $10^{-20}$ grams/cm.$^3$ if the ions are H$^+$. Estimated values for magnetic field and ionic densities in interplanetary space are $10^{-5}$ gauss and $10^{-23}$ grams/cm.$^3$, respectively, and of course increase appreciably as a planet or star is approached.

It can then be concluded generally from consideration of Equation 1 that since B is determined for any particular location in space and $c$ is, of course, a fixed quantity, the velocity $v_c$ of the vehicle will establish a proportionate electric field E. In turn, depending on the field intensity and the precise nature of the plasma at the location of the vehicle, the resultant current and generation of Alfven waves will be determined by the effective over-all resistance of the electrical circuit of which the conductor is one element.

Accordingly, it is a feature of the present invention to provide a method of and apparatus for energy interchange wherein the effective internal resistance of a conductor carried by a space vehicle is designed to control the character and amount of the energy interchange.

In accordance with one aspect of the invention, the internal resistance of the conductor is made positive whereupon the kinetic energy of the space vehicle, and more particularly, of the associated conductor, is converted to electrical energy in the form of Alfven radiation. Consequently, current flowing through the conductor can serve as a source of electrical power as required for operation of the vehicle or for communication purposes. Since, at the same time, kinetic energy is lost, this mechanism functions to lower the velocity of the space vehicle and in the specific case of a satellite, would serve to bring the satellite to a lower altitude without use of any propellant.

In accordance with an alternative aspect of the invention, the effective internal resistance is made negative by use of an independent source of electrical power, such as nuclear reactors or solar panels located on the vehicle and electrically associated with the conductor wherefore ultimately electrical energy is converted to mechanical or kinetic energy of the vehicle. Thus, a novel form of propulsion mechanism is provided which can be used to counteract drag forces on the vehicle, provide additional acceleration thereof, or, in a correlative function, to store electrical energy as kinetic energy.

These as well as other objects and features of the invention will become more apparent from a perusal of the following description taken in conjunction with the accompanying drawing wherein:

FIG. 1 is a diagrammatic perspective view of a conductor moving through a plasma in a direction perpendicular to a constant magnetic field and illustrating the generation of Alfven waves, FIG. 1A is a diagrammatic top plan view of the FIG. 1 illustration, FIG. 2 is a diagrammatic perspective view of a vehicle arranged to convert mechanical to electrical energy in accordance with the present invention, and FIG. 3 is a diagrammatic perspective view of another vehicle which constitutes a modified embodiment of the invention wherein electrical energy is converted to mechanical or kinetic energy.

With initial reference to FIG. 1, a rectangular conductor 10 is assumed as moving through an idealized collisionless plasma with a velocity $v_c$ in a direction perpendicular to a predetermined magnetic field B. The motionally-induced electric field E in the conductor 10 is cancelled by a charge separation, as illustrated, wherein the lower surface of the conductor is positively charged and the upper surface thereof is, in turn, negatively charged. The described motion effects the generation of Alfven waves which propagate at a velocity $v_a$ along the direction of the magnetic field B to form wings 12, 14 projecting outwardly from the conductor in both directions at its upper and lower surfaces. Typically $v_a$ is much larger than $v_c$. Essentially, both the electrons and ions are wrapped around the magnetic field lines and are free to move only along the direction of the magnetic field B so that in effect conductivity parallel to B is infinite but is substantially negligible in a transverse direction.

The Alfven waves propagate along the magnetic field B substantially to infinity if a collisionless plasma is assumed, and since negligible conductivity exists between the two wings 12, 14, theoretically the electric field E between the upper and lower wings remains constant. In actuality of course, collisions do exist between electrons and ions in any plasma and a damping effect therefore exists which limits the length of the wings. Viewed from above, as shown in FIG. 1A, the wings 12, 14, extend outward from the central conductor at an angle $\alpha$ relative to the magnetic field B, $\alpha$ being determined by $$\tan \alpha = \frac{v_c}{v_a} \quad (2)$$

Because of the described charge separation in the conductor 10, electrons move away from the conductor in the upper wings 12 and towards the conductor in the lower wings 14 as indicated by the arrows, thus enabling establishment of a current flow through the conductor and, in effect, providing a complete electrical circuit.

The velocity $v_a$ of the Alfven waves is determined both by the strength of the applied magnetic field B and the mass density of the ions pi, the actual relationship being represented by $$v_a = \sqrt{\frac{B^2}{4\pi \rho_i}} \quad (3)$$

Because of variations both in ionic mass densities and magnetic field strength adjacent the earth at different altitudes, the calculated Alfven velocity is approximately $2 \times 10^7$ cm./sec. at an altitude of 300 kilometers and is approximately $10^9$ cm./sec. at 1600 kilometers.

Additionally the Alfven waves propagate as magnetohydrodynamic disturbances of a frequency $\omega$ which is much less than the ion cyclotron frequency. Calculations indicate that the Alfven frequency ranges from below 200 cycles/sec. at an altitude of 300 kilometers above the earth to a frequency of approximately 2000 cycles/sec. at an altitude of 1600 kilometers. It is well known that typical frequencies radiated by a moving conductor having a dimension L along its direction of motion are given by $$\omega \cong \frac{v_c}{L} \quad (4)$$

If $v_c = 7 \times 10^5$ cm./sec. (a typical satellite velocity) and if $\omega$ is to be less than 1000 cycles/sec., it then follows that the longitudinal dimension of the conductor must be greater than 10 meters. Thus, we must conclude that only relatively large conductors are to be considered in the following discussion. This restriction is not difficult to overcome since, for example, the Echo I satellite has a longitudinal dimension of 30 meters.

As the Alfven waves propagate along the constant applied magnetic field B, they in turn generate a magnetic field $h$ whose approximate value is given by $$h = \frac{v_c}{v_a} B \quad (5)$$

Since the conductor velocity $v_c$ is considerably less than the Alfven velocity, $v_a$ in turn, the generated magnetic field $h$ is considerably less than the applied magnetic field B.

The mentioned characteristics of Alfven waves are not those necessary for an understanding of the present invention. Greater details of the briefly discussed characteristics and explanatory material relative to other aspects of Alfven waves can be found in any recent textbook on plasma physics (e.g. W. B. Thompson—An Introduction to Plasma Physics").

It has already been mentioned that the plasma is idealized as a collisionless plasma and for purposes of the initial discussion, it will be assumed that the conductor is idealized, having no internal resistance and also having no work function restricting flow of current into or out of the surface of the conductor 10.

The discussed characteristics determine the power, current and impedance relationships of the Alfven radiation. More particularly, radiated power is given by $$P = \frac{1}{4\pi} h^2 2(ML) v_a$$

$$= \left(\frac{B^2}{2\pi}\right)\left(\frac{v_c^2}{v_a}\right)(ML) \quad (6)$$

where $2(ML)v_a$ is the volume filled per second by an energy density $h^2/4\pi$, the factor 2 taking into account the existence of wings 12, 14 extending in both directions along the applied magnetic field B. L has been previously defined as the dimension of the conductor along the direction of its motion and the quantity M represents the conductor dimension between the top and bottom thereof as indicated in FIG. 1.

The potential difference V between the upper and lower wings 12, 14 is of course given by $$V = -EM = \frac{v_c}{c} BM \quad (7)$$

and, as a consequence, the current I is given by $$I = \frac{P}{V} = \left(\frac{cv_c}{v_a}\right)\left(\frac{B}{2\pi}\right)L \quad (8)$$

and, in turn, the effective impedance of the plasma for such current flow is then defined as $$Z = \frac{V}{I} = 2\pi \left(\frac{V_a}{c^2}\right)(M/L) \quad (9)$$

In terms of these familiar quantities of electrical circuit theory, the Alfven wings 12, 14 may be interpreted as one dimensional open-ended transmission lines of impedance Z across which a potential V is applied. In this ideal limit of a loss-less medium there is an infinite resistance between the upper and lower line (or Alfven wing) and zero resistance along them. In actuality, corrections due to ion-electron collisions leading to a finite transverse ionic conductivity must be taken into account. Calculations relative to plasma characteristics at 1600 kilometers altitude above the earth and for an object such as Echo I with effective dimensions of $L=M=30$ meters indicate that the radiated power is reduced to $\frac{1}{6}$ of its theoretical value in a collisionless plasma.

An additional effect to be considered in practice is that of the finite work function of the conductor 10 which limits the current flow at its surface. More particularly, with reference to FIG. 1, a negative current flows out from the conductor into the upper Alfven wing 12 while, in turn, negative current flows from the lower wing 14 into the conductor. Since it is well known that cold emission of electrons from a conductor is negligible, means must be provided for heating the conductor. One source for such heat constitutes photoelectric emission resultant from the sun's radiation. It is known that the flux of photons from the sun deposits 0.140 watt/cm.$^2$ as the total irradiance above the atmosphere at the earth's mean distance from the sun. The resultant photoelecric currents of the Echo I satellite in a 1600 kilometer orbit meet the minimal requirements for the necessary Alfven radiation.

By way of example, considering specifically Echo I in a 1600 kilometer orbit where $v_a=10^9$ cm./sec., $v_c=7\times 10^5$ cm./sec. and $B=0.2$ gauss, and whose effective dimensions, L and M, are approximately equal to 30 meters, voltage, power, current and impedance calculations based upon Equations 6, 7, 8, and 9 produce the following values.

$P=3$ watts
$V=3$ volts
$I=\frac{1}{2}$ amp in each wing
$Z=2$ ohms in each wing These values are theoretical, applying to a collisionless plasma. Considering actual ion-electron collisions, the practical power realized would be approximately ⅙ the theoretical value or, in other words, ½ watt and the practical current realized would, in turn, be reduced to 0.2 amp.

The Echo I satellite has a good conducting surface consisting of a few microns of aluminum evaporated on a Mylar base whose work function has a value not more than 4 volts which can be shown to place no restriction on the required current flow of 0.2 amp. Furthermore, the specific conductivity of the aluminum layer is such that the internal resistance of the conductor does not reduce current flow below the requisite value (0.2 amp is this instance).

In view of the foregoing discussion, it is apparent that an effective electro-mechanical energy interchange can be achieved not only theoretically but also in practice. One exemplary space vehicle arranged to make practical utilization of the discussed principles is depicted diagrammatically in FIG. 2. As there shown, the main body portion 20 of a satellite is connected by conducting rods 22, 24, whose combined overall length M is 100 meters and which are oriented perpendicular to the earth's magnetic field B, and are terminated by two conducting cylinders 26, 28, each having a length L along the direction of vehicle travel indicated at $V_c$ of 100 meters and a diameter of 5 meters. In turn, each of the conducting cylinders 26, 28 has mounted thereon a plurality of solar panels or cells (not shown) capable of heating the surface of the conducting cylinders to enable electron emission. It may be mentioned incidentally since the satellite is only exposed to the sun's radiation during a portion of its orbit, alternate means for heating the surfaces of the conducting cylinders can be used if desired, electric heating coils being one obvious example. Connected in series with the conducting rods 22, 24 is a variable resistor diagrammatically indicated at 30 which functions as a control element as will be explained hereafter.

If it is initially assumed that the variable resistor 30 is set at a zero value, and the described unit is orbiting at a relatively low altitude of 400 kilometers at an initial velocity $v_c$ of $7\times 10^5$ cm./sec., the following values are determined.

$L=100$ meters
$M=100$ meters
$v_c=7\times 10^5$ cm./sec.
$v_a=2\times 10^7$ cm./sec.
$B=0.4$ gauss From these values, power, voltage, current and impedance can be calculated in accordance with Equations 6, 7, 8, and 9 to give $P=8$ kilowatts
$V=30$ volts
$I=130$ amps in each wing
$Z=.23$ ohms in each wing Thus, it can be immediately seen that power can be dissipated at the kilowatt level with the described unit as compared to the relatively small power dissipation of the Echo I satellite.

In effect, by setting the variable resistance 30 to a zero value, a power of 8 kilowatts is dissipated in the generated Alfven radiation, such radiation or electrical power being derived from the kinetic energy of the entire space vehicle. A maximal drag force is thus established when the variable resistance is set to zero. By way of example, if the entire vehicle weighs $10^4$ lbs., an altitude loss of 40 kilometers per day will be experienced.

If, in turn, the variable resistance is increased to an infinite value (an open circuit), the drag force is reduced by approximately one order of magnitude since the M factor is effectively reduced from 100 meters to 10 meters, representing the summation of the diameters of the conducting cylinders 26, 28. Intermediate settings of the variable resistor 30 will in turn effect intermediate generation of Alfven radiation and resultant intermediate values of drag force.

It may be mentioned in addition that if the two conducting cylinders 26, 28 are of different sizes, a variation in the relative drag force at opposite extremities of the vehicle will be experienced and, in effect, the entire unit will be rotated about the direction of the earth's magnetic field B.

The drag current I which results from the conversion of kinetic energy of the vehicle into electrical energy can obviously be employed as a source of power for driving a low impedance motor (not shown) which can be inserted electrically in the series with the described connecting rods (with or without the described variable resistance 30). If such a motor has an internal resistance of 0.23 ohm and the variable resistance 30 is set at a zero resistance value, the motor could tap two kilowatts of power (¼ × 8 kilowatts) for use in the vehicle at the expense of its kinetic energy.

Thus, in summary, the arrangement diagrammatically depicted in FIG. 2, can function alternatively as a means of converting kinetic energy to electrical power, a means for creating drag forces to bring the vehicle to a lower altitude without use of additional propellant, or to adjust the attitude of the vehicle without use of supplemental propellant.

Generally, then, the method of electro-mechanical energy interchange in accordance with the present invention involves the steps of moving a conductor across a magnetic field in a plasma whereby current flow can be established through the conductor and then applying a resistance in relation to such conductor whereby the direction and amount of current flow is determined and an electro-mechanical energy interchange is effected.

Obviously, if the effective resistance is positive so that a drag current I is produced as described in connection with the FIG. 2 vehicle, the electro-mechanical energy interchange specifically constitutes a conversion of kinetic energy to electrical energy. In turn, by varying the resistance in the manner described, the amount of such energy interchange can be determined.

By the addition of a souce of electrical power on the vehicle itself, it will be apparent that the direction of current flow through the conductor can be reversed to, in effect, provide a negative resistance and a reversal of the energy interchange; that is, electrical energy will be converted to mechanical or kinetic energy to thus provide a propulsion mechanism.

An exemplary arrangement for this purpose is diagrammatically illustrated in FIG. 3, wherein the arrangement is generally similar to that shown in FIG. 2 wherefore generally the same reference numerals are applied to the various elements with the addition of a distinguishing prime notation.

However, in substitution for the variable resistance 30 shown in FIG. 2, a source of power indicated as a simple battery 32 is connected in a series with the conducting rods 22', 24'. In order to overcome the Alfven drag forces calculated for the FIG. 2 vehicle (i.e. 8 kilowatts), a power of 8 kilowatts is necessary. Such balancing of forces will of course keep a vehicle in a desired orbit and the application of additional power will in turn effect an acceleration of the vehicle to increase its orbital altitude as desired. In effect, the FIG. 3 arrangement pushes on the earth's magnetic field to effect a novel propulsion mechanism.

The source of electrical power indicated diagrammatically as battery 32 may well take the form of a nuclear reactor or solar cells (not shown) of the same type as mentioned in connection with the FIG. 2 embodiment of the invention.

The propulsion method as described in connection with FIG. 3 can not only be used to counteract drag forces and provide acceleration; it can also be utilized as a means for storing energy in the form of vehicle kinetic energy by conversion from electrical energy as described.

What is claimed is:

1. The method of effecting energy interchange in an orbiting space vehicle which comprises the steps of
    moving the vehicle across a magnetic field in a plasma, and
    supporting an open ended conductor on the vehicle in effective electric circuit relation with the plasma to thereby induce current flow therethrough resultant from the motion whereby electro-mechanical energy interchange is achieved.

2. The method of effecting energy interchange in a space vehicle according to claim 1 which comprises the additional step of heating the surface of the conductor to stimulate electron emission therefrom.

3. The method of effecting energy interchange in an orbiting space vehicle which comprises the steps of
    moving the vehicle across a magnetic field in a plasma,
    supporting an open ended conductor on the vehicle in effective electric circuit relation with the plasma to thereby induce current flow therethrough resultant from its motion, and
    applying a resistance in electrical relation to the conductor for determining the amount and direction of current flow.

4. The method of effecting energy interchange according to claim 3 wherein the resistance is positive whereby a conversion of mechanical to electrical energy is achieved.

5. The method of effecting energy interchange according to claim 4 which comprises varying the resistance value to vary the amount of energy interchange.

6. The method of effecting energy interchange according to claim 3 wherein the resistance is negative to effect a conversion of electrical energy to kinetic energy of the vehicle.

7. The method of propelling a space vehicle which comprises the steps of
    moving the vehicle across a magnetic field in a plasma,
    supporting an open ended conductor on the vehicle in effective electric circuit relation with the plasma to thereby induce current flow therethrough in a predetermined direction resultant from the motion of the vehicle, and
    applying a source of electrical power to the conductor to establish current flow therethrough in a direction opposite to that of induced current flow whereby the applied electrical energy is converted to kinetic energy of the vehicle.

8. The method of propelling a space vehicle according to claim 7 which comprises the additional step of
    supporting solar cells on the vehicle for exposure to radiation from the sun to provide the source of electrical power.

9. Energy-interchange apparatus for an orbiting space vehicle travelling through a plasma which comprises
    an open ended conductor mounted on said vehicle so as to cross the magnetic field in a plasma so as to establish effective electric circuit relation with the conductor and effect current flow therethrough and the generation of Alfven waves, and
    means electrically associated with said conductor to provide a predetermined resistance to current flow therethrough.

10. Energy-interchange apparatus according to claim 9 wherein said means constitutes a variable positive resistance.

11. Energy-interchange apparatus according to claim 9 wherein said means constitutes a source of electrical power to provide effectively a negative resistance.

12. Energy-interchange apparatus according to claim 9 which comprises a heater for the surface of said conductor.

References Cited

UNITED STATES PATENTS

| 3,106,058 | 10/1963 | Rice | 310—11 |
| 3,156,433 | 11/1964 | White | 310—11 X |
| 3,225,208 | 12/1965 | Wolfe | 244—1 |
| 3,048,351 | 8/1962 | Donoho | 244—1 |

FERGUS S. MIDDLETON, Primary Examiner

U.S. Cl. X.R.

310—11